United States Patent
Hashimoto

(10) Patent No.: US 8,799,699 B2
(45) Date of Patent: Aug. 5, 2014

(54) DATA PROCESSING SYSTEM

(75) Inventor: Akinori Hashimoto, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 337 days.

(21) Appl. No.: 13/041,845

(22) Filed: Mar. 7, 2011

(65) Prior Publication Data

US 2011/0314197 A1    Dec. 22, 2011

(30) Foreign Application Priority Data

Jun. 21, 2010  (JP) ................................ 2010-140184

(51) Int. Cl.
    *G06F 1/00*      (2006.01)
    *G06F 13/00*     (2006.01)
    *G06F 13/362*    (2006.01)

(52) U.S. Cl.
    USPC ............ 713/501; 713/500; 710/110; 710/113

(58) Field of Classification Search
    USPC .......... 710/107, 110, 113, 116; 713/500–501, 713/600–601
    See application file for complete search history.

(56) References Cited

U.S. PATENT DOCUMENTS

| | | | |
|---|---|---|---|
| 5,440,751 A * | 8/1995 | Santeler et al. | 710/22 |
| 7,007,121 B1 * | 2/2006 | Ansari et al. | 710/113 |
| 2002/0029365 A1 * | 3/2002 | Sato et al. | 714/763 |
| 2002/0133645 A1 * | 9/2002 | Ku | 710/22 |
| 2003/0043790 A1 * | 3/2003 | Gutierrez | 370/362 |
| 2009/0083559 A1 | 3/2009 | Matsumoto | |
| 2009/0313441 A1 * | 12/2009 | Mochida et al. | 711/150 |
| 2010/0223409 A1 * | 9/2010 | Minami et al. | 710/110 |
| 2011/0145622 A1 * | 6/2011 | Senohrabek et al. | 713/400 |

FOREIGN PATENT DOCUMENTS

| | | |
|---|---|---|
| JP | 2007-207121 A | 8/2007 |
| JP | 2009-75973 A | 4/2009 |

* cited by examiner

*Primary Examiner* — Thomas J Cleary
(74) *Attorney, Agent, or Firm* — Arent Fox LLP

(57) ABSTRACT

Each of a plurality of master devices outputs a speed grade signal indicating a data transfer speed with a data transfer request. An arbiter arbitrates transfer requests and speed grade signals from the plurality of master devices. A clock enable generation circuit generates a clock enable signal with a varying ratio of a valid level according to the speed grade signal arbitrated by the arbiter. A slave device operates upon receiving a clock signal when the clock enable signal is at the valid level, and transfers data according to the transfer request arbitrated by the arbiter. Accordingly, the frequency of the clock signal which causes the slave device to operate may be changed for each transfer request, and a fine control of the power of the slave device may be easily performed. As a result, power consumption of the data processing system may be finely controlled.

8 Claims, 12 Drawing Sheets

DATA PROCESSING SYSTEM

CROSS-REFERENCE TO RELATED APPLICATION

This application is based upon and claims the benefit of priority of the prior Japanese Patent Application No. 2010-140184, filed on Jun. 21, 2010, the entire contents of which are incorporated herein by reference.

FIELD

The present embodiments relate to a data processing system including a master which outputs a transfer request and a slave which transfers data in response to the transfer request.

BACKGROUND

In order to reduce power consumption in a data processing system operating in synchronization with a clock signal, there have been proposed methods of supplying a clock signal from a circuit block which performs a process first to a circuit block which performs the process next. For example, each of circuit blocks operates upon receiving a clock signal when a clock enable signal is at a valid level. Related arts are discussed in Japanese Laid-open Patent Publication Nos. 2009-75973 and 2007-207121.

A clock enable signal is generated in accordance with an operation period of the circuit block, based on a program executed by a processor such as a CPU. Therefore, it is difficult to switch the clock enable signal very frequently and dynamically change the frequency of the clock signal according to the operation state of each of the circuit blocks. As a result, a fine power control may not be performed to reduce power consumption.

SUMMARY

According to an aspect of the present embodiments, a data processing system includes a plurality of master devices outputting data transfer requests and speed grade signals indicating data transfer speeds, an arbiter arbitrating the transfer requests and the speed grade signals from the plurality of master devices, a clock enable generation circuit generating a clock enable signal with a varying ratio of a valid level according to one of the speed grade signals arbitrated by the arbiter, and a slave device operating upon receiving a clock signal when the clock enable signal is at the valid level and transferring data according to one of the transfer requests arbitrated by the arbiter.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

Figure 1:
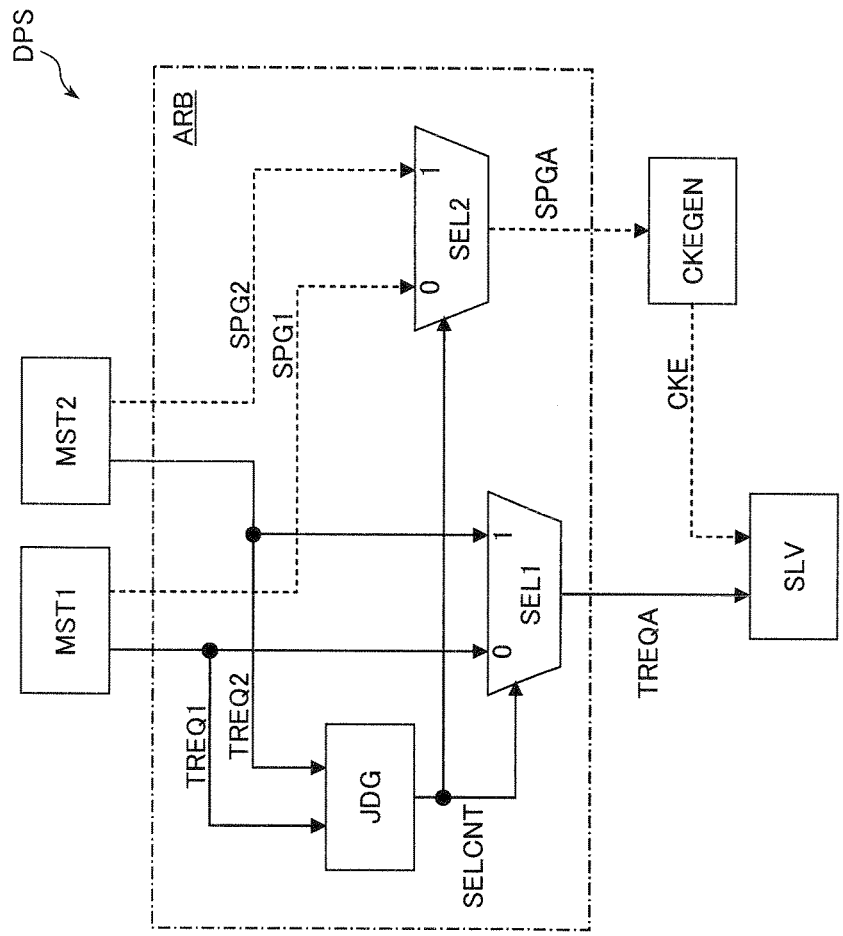
FIG. 1 illustrates an example of a data processing system in an embodiment.

An embodiment will be described below, referring to the drawings.

FIG. 1 illustrates an example of a data processing system DPS in an embodiment. The data processing system DPS has a plurality of masters MST (MST1, MST2), an arbiter ARB, a clock enable generation circuit CKEGEN, and a slave SLV. The masters MST have a function of outputting transactions such as transfer requests TREQ (TREQ1, TREQ2), and each operates as a bus master. Each transfer request TREQ includes a control signal and an address signal for accessing the slave SLV. The slave SLV is a semiconductor memory such as an SRAM, or a peripheral device such as a timer or a communication interface.

Each master MST outputs, with the data transfer request TREQ of data, speed grade signals SPG (SPG1, SPG2) indicating a data transfer speed. For example, each master MST outputs a speed grade signal SPG for each transfer request TREQ.

The arbiter ARB has a judgment circuit JDG and selectors SEL1 and SEL2. The judgment circuit JDG outputs a selection control signal SELCNT in response to the transfer requests TREQ1-2. For example, the selection control signal SELCNT is set to logic "0" in response to the transfer request TREQ1 and set to logic "1" in response to the transfer request TREQ2. Also, the judgment circuit JDG outputs the selection control signal SELCNT according to a certain priority when the transfer requests TREQ1-2 compete.

For example, the priority of a transfer request TREQ1 is higher than the priority of a transfer request TREQ2. When the transfer requests TREQ1-2 compete, the judgment circuit JDG outputs the selection control signal SELCNT of logic "0" in order to prioritize data transfer corresponding to the transfer request TREQ1. The judgment circuit JDG then outputs the selection control signal SELCNT of logic "1" in order to perform data transfer corresponding to the transfer request TREQ2, after the data transfer corresponding to the transfer request TREQ1.

While receiving the selection control signal SELCNT of logic "0", the selector SEL1 outputs the transfer request TREQ1 as a transfer request TREQA. While receiving the selection control signal SELCNT of logic "1", the selector SEL1 outputs the transfer request TREQ2 as the transfer request TREQA. While receiving the selection control signal SELCNT of logic "0", the selector SEL2 outputs the speed grade signal SPG1 as a speed grade signal SPGA. While receiving the selection control signal SELCNT of logic "1", the selector SEL2 outputs the speed grade signal SPG2 as the speed grade signal SPGA.

Each of the speed grade signals SPG1-2 is used to determine an operation frequency of the slave SLV and controls power consumption of the slave SLV. In FIG. 1, a dashed line indicates a signal line for changing the operation frequency of the slave SLV. The arbiter ARB selectively outputs the transfer request TREQ1 (or TREQ2) and the speed grade signal SPG1 (or SPG2) using the selectors SEL1-2, based on the result of judgment by the judgment circuit JDG. In other words, the arbiter ARB arbitrates the transfer requests TREQ1-2 and the speed grade signals SPG1-2. The selectors SEL1-2 may be formed by a single circuit.

Figure 4:
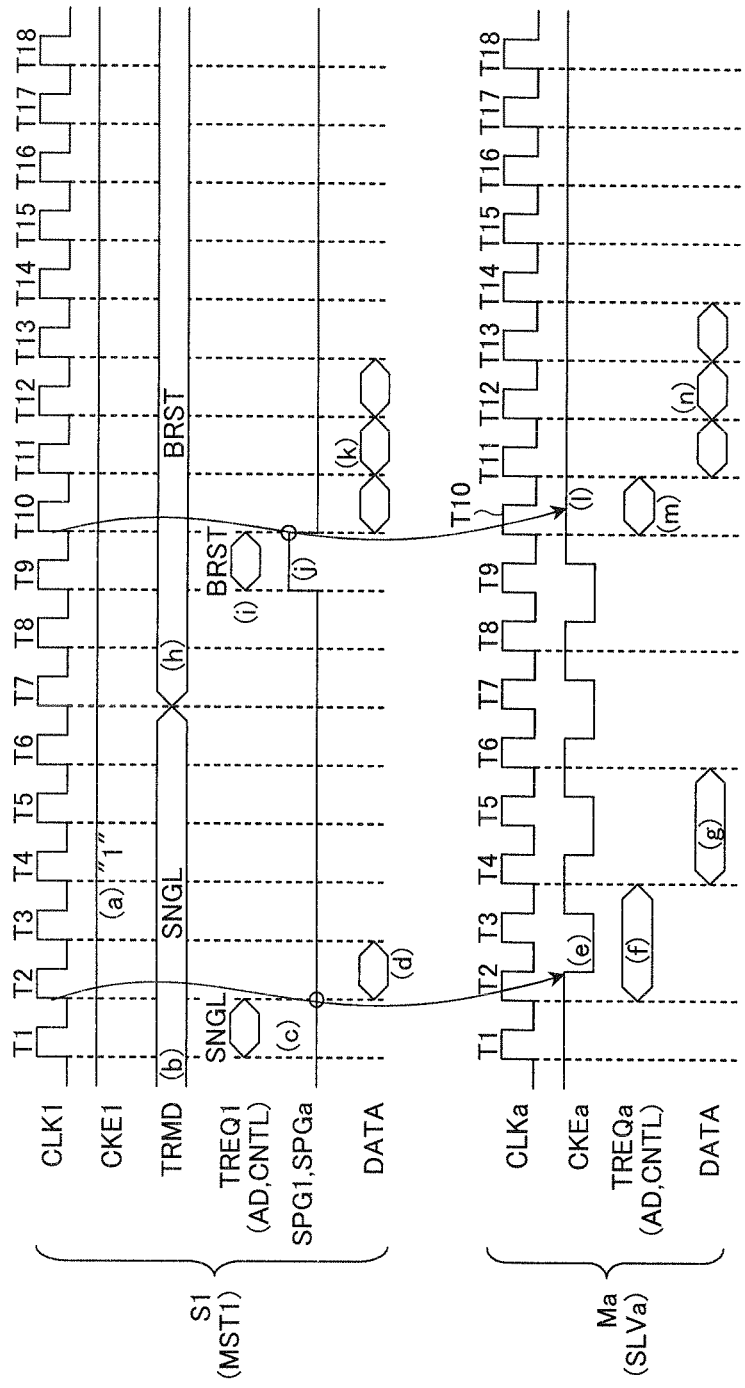
FIG. 4 illustrates an example of an operation of the data processing system illustrated in FIG. 2.

The clock enable generation circuit CKEGEN generates a clock enable signal CKE with a varying ratio of a valid level according to the speed grade signal SPGA which is either one of the speed grade signals SPG1-2 arbitrated by the arbiter ARB. For example, when the speed grade signal SPCA has logic "0", for example, the clock enable generation circuit CKEGEN generates the clock enable signal CKE that lowers the operation frequency of the slave SLV. When the speed grade signal SPGA has logic "1", the clock enable generation circuit CKEGEN generates the clock enable signal CKE that raises the operation frequency of the slave SLV. For example, the clock enable generation circuit CKEGEN lowers the ratio of the period of the logic "1" which is the valid level of the clock enable signal CKE as illustrated in FIG. 4, when lowering the operation frequency of the slave SLV.

The slave SLV receives a clock signal CLK when the clock enable signal CKE is at the valid level and operates in synchronization with the received clock signal CLK. The longer the valid level period of the clock enable signal CKE is, the higher the frequency of the clock signal CLK becomes. The slave SLV then transfers, in response to the transfer request TREQ, data in synchronization with the clock signal CLK. Data transfer rate becomes higher and power consumption of the slave SLV becomes larger when the valid level ratio of the clock enable signal CKE is high and the frequency of the clock signal CLK is high. Data transfer rate becomes lower and power consumption of the slave SLV becomes smaller when the valid level ratio of the clock enable signal CKE is low and the frequency of the clock signal CLK is low.

When the transfer request TREQA is a write request, the slave SLV writes the write data supplied from the master MST1 or MST2 into a memory area selected by an address in the slave SLV. If the transfer request TREQA is a read request, the slave SLV outputs the data stored in the memory area selected by an address to the master MST1 or MST2.

The data processing system DPS may have two or more slaves SLV. In this occasion, the masters MST1-2 output the transfer requests TREQ1-2 and the speed grade signals SPG1-2 with information that indicates the slave SLV to be accessed. The arbiter ARB and the clock enable generation circuit CKEGEN are formed for each slave SLV.

In this embodiment, the speed grade signals SPG1-2 are output from the masters MST1-2 with the transfer requests TREQ1-2. Therefore, the clock enable generation circuit CKEGEN may generate the clock enable signal CKE corresponding to the speed grade signals SPG1-2 for each of the transfer requests TREQ1-2. Accordingly, the frequency of the clock signal CLK that causes the slave SLV to operate (in other words, operation frequency of the slave SLV) may be changed for each of the transfer requests TREQ1-2, and power consumption of the slave SLV may be controlled more finely. As a result, a fine control may be easily performed on dynamic power of the data processing system DPS, and power consumption may be reduced without degrading performance of the data processing system DPS.

Figure 2:
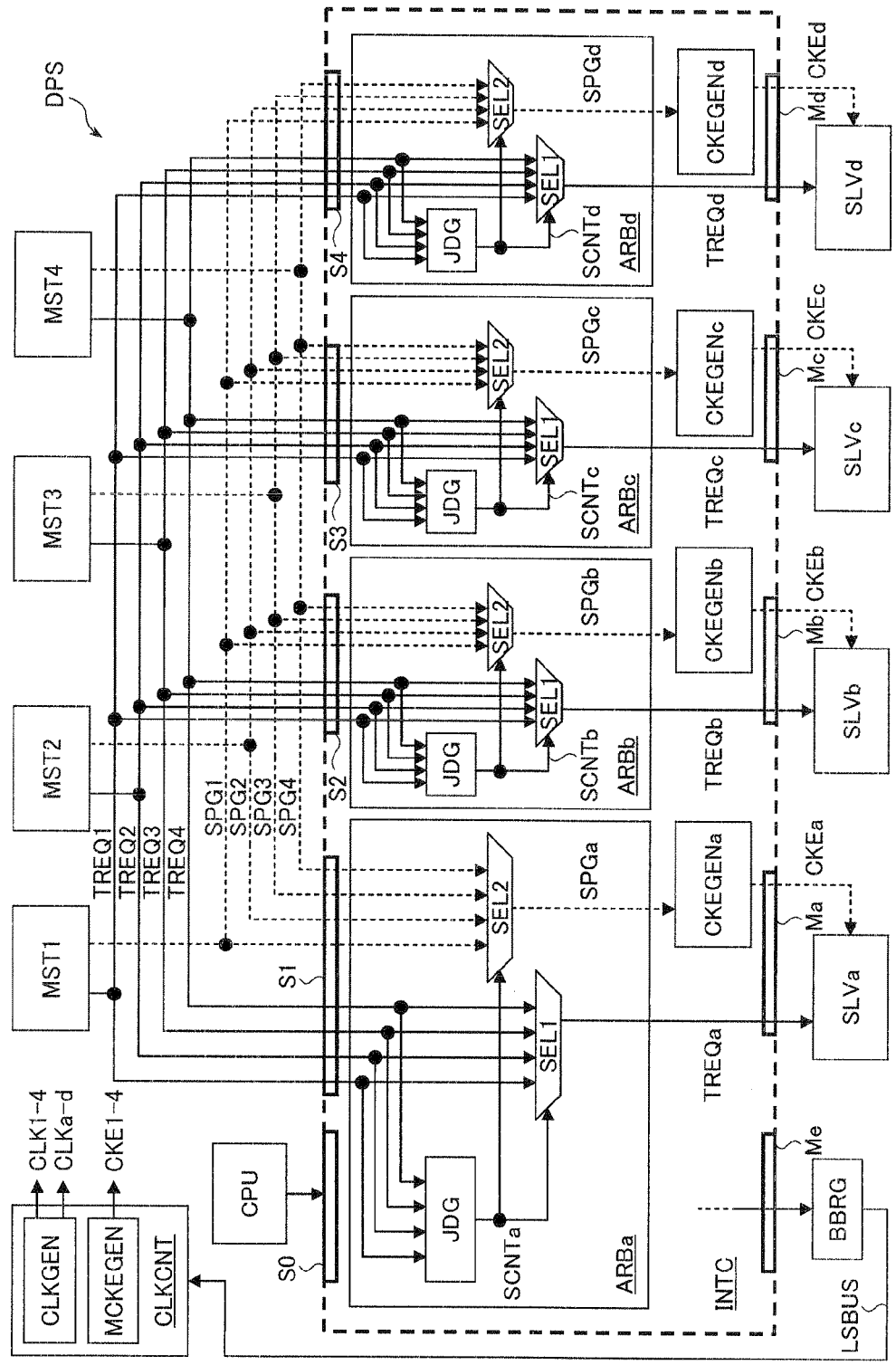
FIG. 2 illustrates an example of a data processing system in another embodiment.

FIG. 2 illustrates an example of a data processing system DPS in another embodiment. The components identical to those described in the above-mentioned embodiment are provided with identical symbols and detailed description thereof is omitted. For example, the data processing system DPS is a microcomputer application product such as a digital consumer product.

The data processing system DPS has a processor such as a CPU coupled via an interconnect INTC which is one type of a high-speed bus interface, a plurality of masters MST (MST1-MST4), a plurality of slaves SLV (SLVa-SLVd), a bus bridge BBRG, and a clock control circuit CLKCNT coupled to the bus bridge BBRG via a low speed bus interface LSBUS.

The masters MST1-4 each has a function of outputting transaction such as the transfer request TREQ (TREQ1-TREQ4) and operates as bus masters with the CPU. The masters MST1-4 each outputs speed grade signal SPG (SPG1-SPG4) indicating data transfer speed with the data transfer request TREQ. For example, each of the speed grade signals SPG1-4 is output for each of the transfer requests TREQ1-4. The function of each of the speed grade signals SPG1-4 is similar to that of FIG. 1.

The interconnect INTC has slave ports S0-S4, arbiters ARBa-ARBd, clock enable generation circuits CKEGENa-CKEGENd, and master ports Ma-Me. The slave ports S0-S4 are coupled to the CPU and the masters MST1-4, respectively. The master ports Ma-Me are coupled to slaves SLVa-SLVd and the bus bridge BBRG, respectively. The arbiters ARBb-d, the clock enable generation circuits CKEGENb-d, and the master ports Mb-Md corresponding to the slaves SLVb-d are not formed when the data processing system DPS does not include the slaves SLVb-SLVd.

Each of the arbiters ARBa-ARBd, being a circuit similar to that of the arbiter ARB illustrated in FIG. 1, has the judgment circuit JDG and the selectors SEL1-2. However, the judgment circuit JDG arbitrates the transfer requests TREQ1-4 from the four masters MST1-4 and outputs the selection control signal SCNT (one of SCNTa-SCNTd). In order to identify the masters MST1-4, each of the selection control signals SCNTa-d has 2 bits, for example.

The selector SEL1 selects one of the transfer requests TREQ1-4 according to the selection control signal SCNT and outputs it as a selection request TREQ (one of TREQa-TREQd). The selector SEL2 selects one of the speed grade signals SPG 1-4 according to the selection control signal SCNT and outputs it as the speed grade signal SPG (one of SPGa-SPGd). In FIG. 2, similarly in FIG. 1, a signal line for changing the operation frequency of the slaves SLVa-d is indicated by the dashed line. The path that transmits the address and the write data output from the masters MST1-4 to the slaves SLVa-d is identical to the path that transmits the transfer requests TREQ1-4. The path that transmits the read data input to the masters MST1-4 from the slaves SLVa-d is identical to the path that transmits the transfer requests TREQ1-4 except that the transmission direction is reverse.

Each of the clock enable generation circuits CKEGENa-CKEGENd generates the clock enable signal CKE (one of CKEa-CKEd) according to the speed grade signal SPG (one of SPGa-SPGd). The slaves SLVa-SLVd are semiconductor memories such as SRAMs or peripheral devices such as timers or communication interfaces. The bus bridge BBRG performs mutual conversion between the high-speed bus protocol of the interconnect INTC and the low-speed bus protocol of the low speed bus interface LSBUS.

The clock control circuit CLKCNT has a clock generation circuit CLKGEN and a clock enable generation circuit MCKEGEN. The clock generation circuit CLKGEN and the clock enable generation circuit MCKEGEN are set according to frequency information that indicates the frequency of the clock signal supplied from the CPU via the slave port S0, the master port Me, the bus bridge BBRG, and the low speed bus interface LSBUS.

The clock generation circuit CLKGEN generates clock signals CLK1-4 to be respectively supplied to the masters MST1-4 and clock signals CLKa-d to be respectively supplied to the slaves SLVa-SLVd, according to the frequency information from the CPU. Although the frequencies of the clock signals CLK1-4 and CLKa-d are set to be equal in this example for simplicity, the frequencies of the clock signals CLK1-4 and CLKa-d may be different from each other. Furthermore, the clock generation circuit CLKGEN may generate a clock signal to be supplied to the CPU, the interconnect INTC, and the bus bridge BBRG.

The clock enable generation circuit MCKEGEN generates clock enable signals CKE1-4 to be respectively supplied to the masters MST1-4, according to the frequency information from the CPU. The clock enable signals CKE1-4 are fixed to logic "1" in this example for simplicity.

Figure 3:
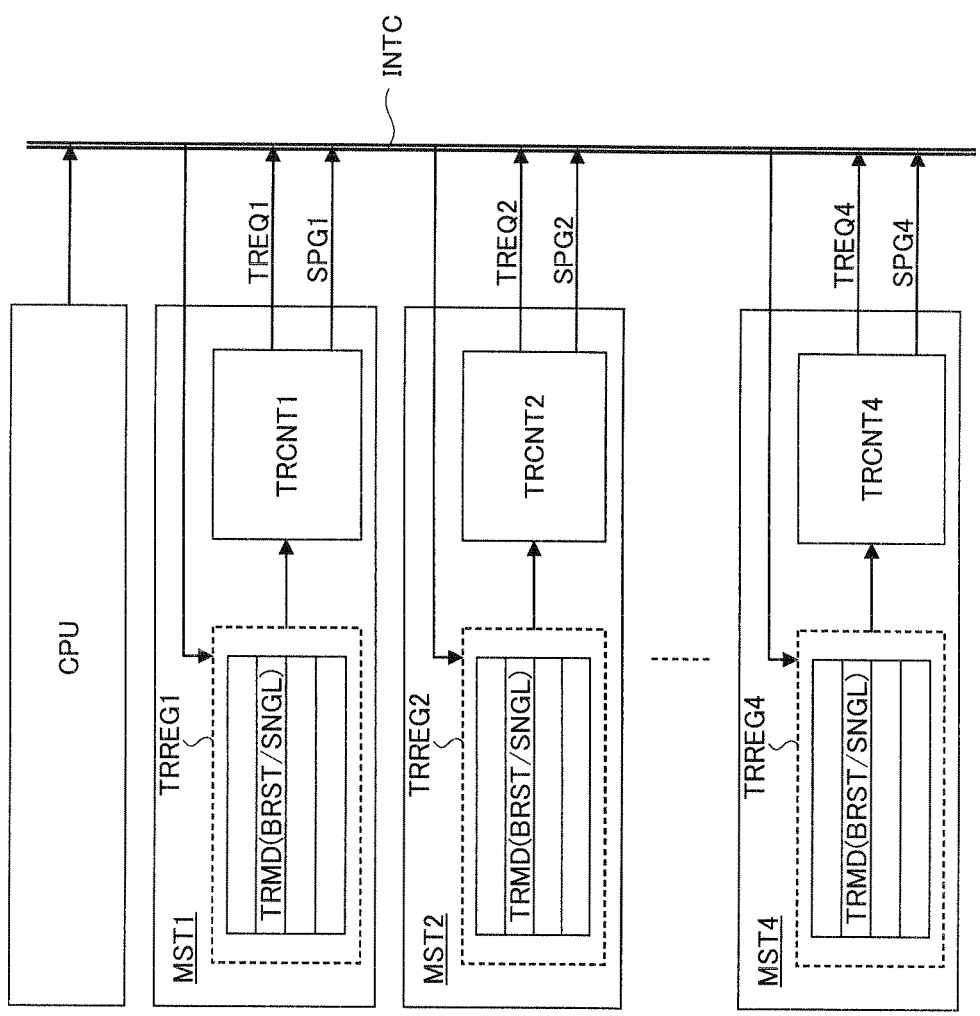
FIG. 3 illustrates an example of masters illustrated in FIG. 2.

FIG. 3 illustrates an example of the masters MST1-4 illustrated in FIG. 2. The masters MST1-4 each has a transfer set register TRREG (TRREG1-4) and a transfer control circuit TRCNT (TRCNT1-4). The transfer set registers TRREG1-4 are identical to each other and the transfer control circuits TRCNT1-4 are identical to each other, although not particularly limited thereto. The transfer set registers TRREG1-4 are set by a processor such as the CPU via the interconnect INTC.

Each of the transfer set registers TRREG1-4 has a transfer mode register TRMD. For example, the transfer mode register TRMD indicates a burst transfer mode BRST at logic "1" and indicates a single transfer mode SNGL at logic "0". In other words, the transfer mode register TRMD has set therein information that indicates the data transfer method. The burst transfer mode BRST is an operation mode that writes a plurality of pieces of data into the slave SLV (one of SLVa-SLVd), or reads a plurality of pieces of data from the slave SLV, in response to a single transfer request TREQ. The single transfer mode SNGL is an operation mode that writes a single piece of data into the slave SLV, or reads a single piece of data from the slave SLV, in response to a single transfer request TREQ.

Each of the transfer control circuits TRCNT1-4 has a function of generating the transfer request TREQ (one of TREQ1-4) to access one of the slaves SLVa-SLVd and perform data input or output with the slaves SLVa-SLVd. In addition, each of the transfer control circuits TRCNT1-4 has a function of generating the speed grade signal SPG (one of SPG1-4), according to the transfer mode set in the corresponding transfer mode register TRMD.

For example, when the transfer mode register TRMD indicates the single transfer mode SNGL (logic "0"), each of the transfer control circuits TRCNT1-4 outputs, with the transfer request TREQ, the speed grade signal SPG of logic "0". On the other hand, when the transfer mode register TRMD indicates the burst transfer mode BRST (logic "1"), the speed grade signal SPG of logic "1" is output with the transfer request TREQ.

Logic "0" indicating the register transfer mode or logic "1" indicating the data transfer mode may be stored in the transfer mode register TRMD. The register transfer mode is a transfer mode for accessing registers in the slaves SLVa-SLVd. The data transfer mode is a transfer mode for accessing memory cells in the slaves SLVa-SLVd. When the transfer mode register TRMD indicates the register transfer mode (logic "0"), each of the transfer control circuits TRCNT1-4 outputs the speed grade signal SPG of logic "0" with the transfer request TREQ. On the other hand, when the transfer mode register TRMD indicates the data transfer mode (logic "1"), the speed grade signal SPG of logic "1" is output with the transfer request TREQ.

FIG. 4 illustrates an example of an operation of the data processing system DPS illustrated in FIG. 2. FIG. 4 illustrates, as an example, a waveform of a signal output from the master MST1 to the slave port S1 and a waveform of a signal output from the master port Ma to the slave SLVa.

In FIG. 4, the slave port S1 operates in synchronization with a clock signal having the same frequency as the clock signal CLK1 supplied to the master MST1. The master port Ma operates in synchronization with a clock signal having the same frequency as the clock signal CLKa supplied to the slave SLVa. The waveforms of the signals output from the masters MST2-4 to the slave ports S2-4 are similar to the waveform of the slave port S1. The waveforms of the signals output from the master ports Mb-d to the slaves SLVb-d are similar to the waveform of the master port Ma.

The clock enable generation circuit MCKEGEN of the clock control circuit CLKCNT illustrated in FIG. 2 sets the clock enable signal CKE1 to be supplied to the master MST1 to logic "1" (FIG. 4 (a)). Therefore, the master MST1 operates in synchronization with each rising edge of the clock signal CLK1.

The transfer mode register TRMD of the master MST1 illustrated in FIG. 3 has been set to the single transfer mode SNGL before the master MST1 first outputs the transfer request TREQ1 (FIG. 4 (b)). Therefore, in a clock cycle T1 of the clock signal CLK1, the transfer control circuit TRCNT1 illustrated in FIG. 3 outputs the speed grade signal SPG1 of logic "0" with the transfer request TREQ1 (FIG. 4 (c)). In this example, the transfer request TREQ1 (the address AD and the control signal CNTL) is a data write request to the slave SLVa. The master MST1 outputs a single piece of write data DATA in synchronization with a clock cycle T2 of the clock signal CLK1 (FIG. 4 (d)).

The slave port S1 receives the transfer request TREQ1 and the speed grade signal SPG1 in synchronization with the rising edge of clock cycle T2 of the clock signal CLK1, and outputs the received signal to the arbiter ARBa. In this example, there is no competition among the transfer requests TREQ1-4. Therefore, the arbiter ARBa outputs the transfer request TREQ1 from the slave port S1 to the master port Ma as the transfer request TREQa. In addition, the arbiter ARBa outputs the speed grade signal SPG1 from the slave port S1 to the clock enable generation circuit CKEGENa as the speed grade signal SPGa.

The clock enable generation circuit CKEGENa illustrated in FIG. 2 receives the speed grade signal SPGa of logic "0", inverts the logic level of a clock enable signal CKEa for each falling edge of the clock signal CLKa, and outputs it to the master port Ma (FIG. 4 (e)).

The master port Ma outputs the clock enable signal CKEa to the slave SLVa. In addition, the master port Ma outputs the transfer request TREQa to the slave SLVa in synchronization with the rising edge of the clock signal CLKa appearing in the period of logic "1" of the clock enable signal CKEa (FIG. 4 (f)). The transfer request TREQa is output in the period of two clock cycles T2 and T3. Furthermore, the master port Ma outputs a single piece of write data DATA to the slave SLVa in the period of two clock cycles T4 and T5 (FIG. 4 (g)).

As thus described, the rising edges of the odd-numbered clock cycles T3, T5, T7, and T9 of the clock signal CLKa in this example are masked to be invalid. The slave SLVa operates in synchronization with the rising edge of the clock signal CLKa appearing in the period of logic "1" of the clock enable signal CKEa. In other words, the operation frequency of the slave SLVa becomes low when the valid level ratio (logic "1") of the clock enable signal CKEa is low. In this example, the operation frequency of the slave SLVa becomes half the frequency of the clock signal CLKa. By lowering the operation frequency, dynamic power of the slave SLVa may be reduced.

The slave SLVa receives the transfer request TREQa (the address AD and the control signal CNTL) from the master MST1 in synchronization with the clock cycle T2 of the clock signal CLKa, and starts a write operation. Next, the slave SLVa writes the write data DATA into an internal circuit such as a memory cell in the period of the clock cycles T4 and T5 of the clock signal CLKa.

Subsequently, the transfer mode register TRMD of the master MST1 is rewritten from the single transfer mode SNGL into the burst transfer mode BRST in synchronization with a clock cycle T7 of the clock signal CLK1 (FIG. 4 (h)). The rewrite timing of the transfer mode register TRMD is not limited to the clock cycle T7 and any one of the clock cycles T3-T8 will suffice.

The transfer control circuit TRCNT1 of the master MST1 outputs the transfer request TREQ1 indicating the data write request to the slave SLVa and the speed grade signal SPG1 of logic "1" indicating the burst transfer mode BRST, in synchronization with a clock cycle T9 of the clock signal CLK1 (FIG. 4 (i, j)).

In this example, the burst length has been preliminarily set to "3". Here, the burst length is the number of times the write data is output from the master MST1 or the number of times the read data is input to the master MST1 in response to a single transfer request TREQ1. The master MST1 outputs the write data DATA for a number of times corresponding to the burst length in synchronization with clock cycles T10-T12 of the clock signal CLK1, respectively (FIG. 4 (k)).

The slave port S1 receives the transfer request TREQ1 and the speed grade signal SPG1 of logic "1" in synchronization with the rising edge of a clock cycle T10 of the clock signal CLK1, and outputs the received signal to the arbiter ARBa. There is no competition among the transfer requests TREQ1-4. The clock enable generation circuit CKEGENa receives the speed grade signal SPG1 of logic "1" as the speed grade signal SPGa, fixes the clock enable signal CKEa to logic "1", and outputs it to the master port Ma (FIG. 4 (l)).

The master port Ma outputs the clock enable signal CKEa of logic "1" to the slave SLVa. In addition, the master port Ma outputs the transfer request TREQa to the slave SLVa in synchronization with the clock cycle T10 of the clock signal CLKa (FIG. 4 (m)). The slave SLVa receives the transfer request TREQa in the clock cycle T10 of the clock signal CLKa and starts the write operation.

Next, the master port Ma outputs three pieces of write data DATA sequentially to the slave SLVa in synchronization with clock cycles T11-T13 of the clock signal CLKa, respectively (FIG. 4 (n)). The slave SLVa then writes the three pieces of write data DATA sequentially into an internal circuit such as a memory cell in synchronization with the clock cycles T11-T13. In other words, a burst write operation is performed.

Since the clock enable signal CKEa is fixed to logic "1" in the burst transfer operation, the slave SLVa operates in synchronization with each of the rising edges of the clock signal CLKa. Accordingly, the operation frequency of the slave SLVa becomes high. In other words, when the valid level ratio (logic "1") of the clock enable signal CKEa is high, the operation frequency of the slave SLVa becomes high, and the dynamic power of the slave SLVa increases. However, in the burst transfer mode BRST in which data transfer rate is desired to be high, the slave SLVa may be caused to operate at a high speed.

The operation when the register transfer mode or the data transfer mode is stored in the transfer mode register TRMD is realized by replacing the single transfer mode SNGL of FIG. 4 with the register transfer mode and replacing the burst transfer mode BRST with the data transfer mode. In this occasion, a burst transfer with a burst length of "3" is performed as a transfer according to the data transfer mode.

As thus described, this embodiment also brings about a similar effect to that of the above-mentioned embodiments. In other words, the operation frequency and power consumption of the slave SLVa may be dynamically changed for each transfer request TREQ1 according to the logic of the speed grade signal SPG1. Furthermore, the operation frequency of the slave SLVa may be changed for each transfer request TREQ1 in correspondence with the transfer mode (transfer method) set in the transfer mode register TRMD. For example, the operation frequency of the slave SLVa may be raised during the burst transfer mode BRST and lowered during the single transfer mode SNGL. Alternatively, the operation frequency of the slave SLVa may be raised during the data transfer mode and lowered during the register transfer mode.

Figure 5:
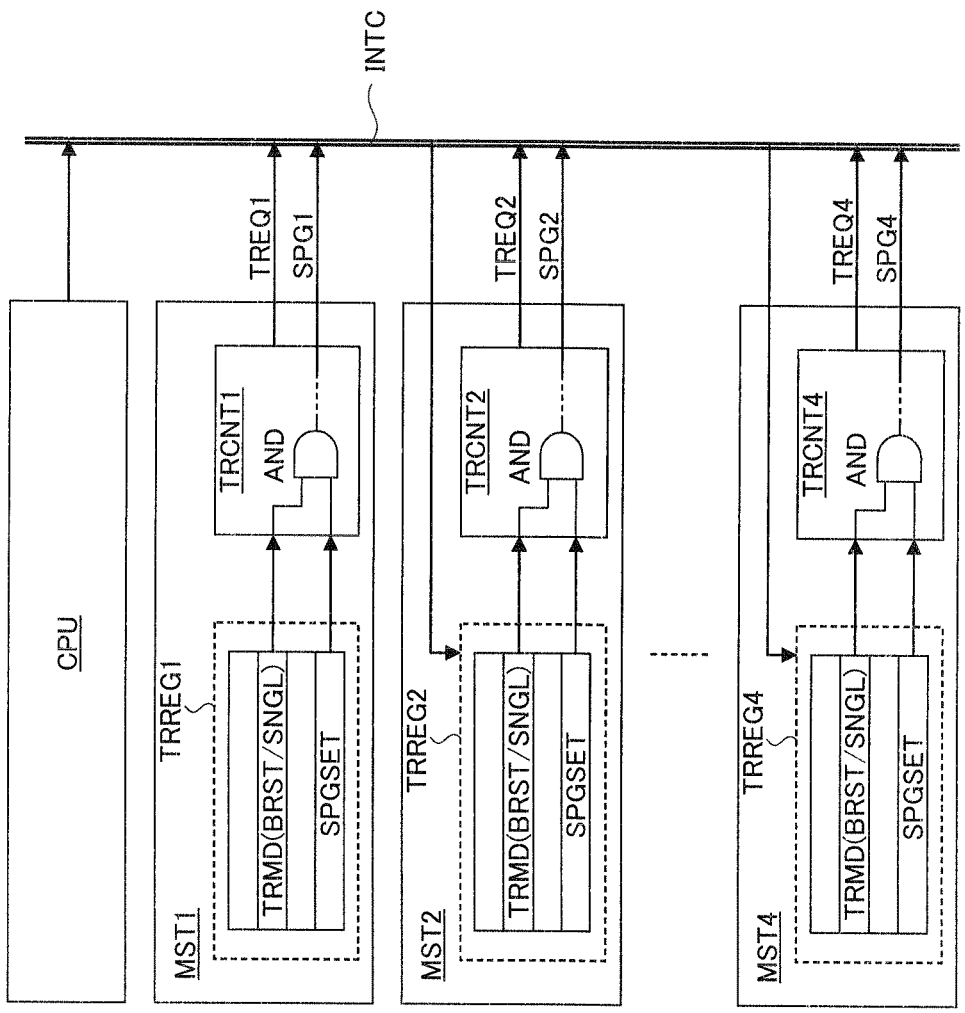
FIG. 5 illustrates an example of masters in another embodiment.

FIG. 5 illustrates an example of masters MST1-MST4 in another embodiment. The components identical to those described in the above-mentioned embodiment are provided with identical symbols and detailed description thereof is omitted. The configuration excluding the masters MST1-4 is similar to that of the data processing system DPS illustrated in FIG. 2.

As for the masters MST1-4, the transfer set registers TRREG1-4 and the transfer control circuits TRCNT1-4 are different from those of FIG. 3. Each of the transfer set registers TRREG1-4 has a speed grade set register SPGSET added to each of the transfer set registers TRREG1-4 illustrated in FIG. 3. The speed grade set register SPGSET sets the transfer mode register TRMD to an invalid state at logic "0" and sets the transfer mode register TRMD to a valid state at logic "1". For example, the speed grade set register SPGSET is set to logic "0" if the data processing system DPS has been set to a low power mode.

Each of the transfer control circuits TRCNT1-4 has an AND circuit which receives the logic of the transfer mode register TRMD and the logic of speed grade set register SPGSET. The transfer control circuits TRCNT1-4 output the speed grade signals SPG1-4 with the transfer requests TREQ1-4, respectively, according to the result of operation by the AND circuit.

When the speed grade set register SPGSET is reset to logic "0", each of the speed grade signals SPG1-4 is fixed to logic "0" indicating a preliminarily set low transfer speed, regardless of the set value of the transfer mode register TRMD. In addition, when the speed grade set register SPGSET is set to logic "1", each of the speed grade signals SPG1-4 is output according to the set value of the transfer mode register TRMD. Logic "0" indicating the register transfer mode or logic "1" indicating the data transfer mode may be stored in the transfer mode register TRMD.

Figure 6:
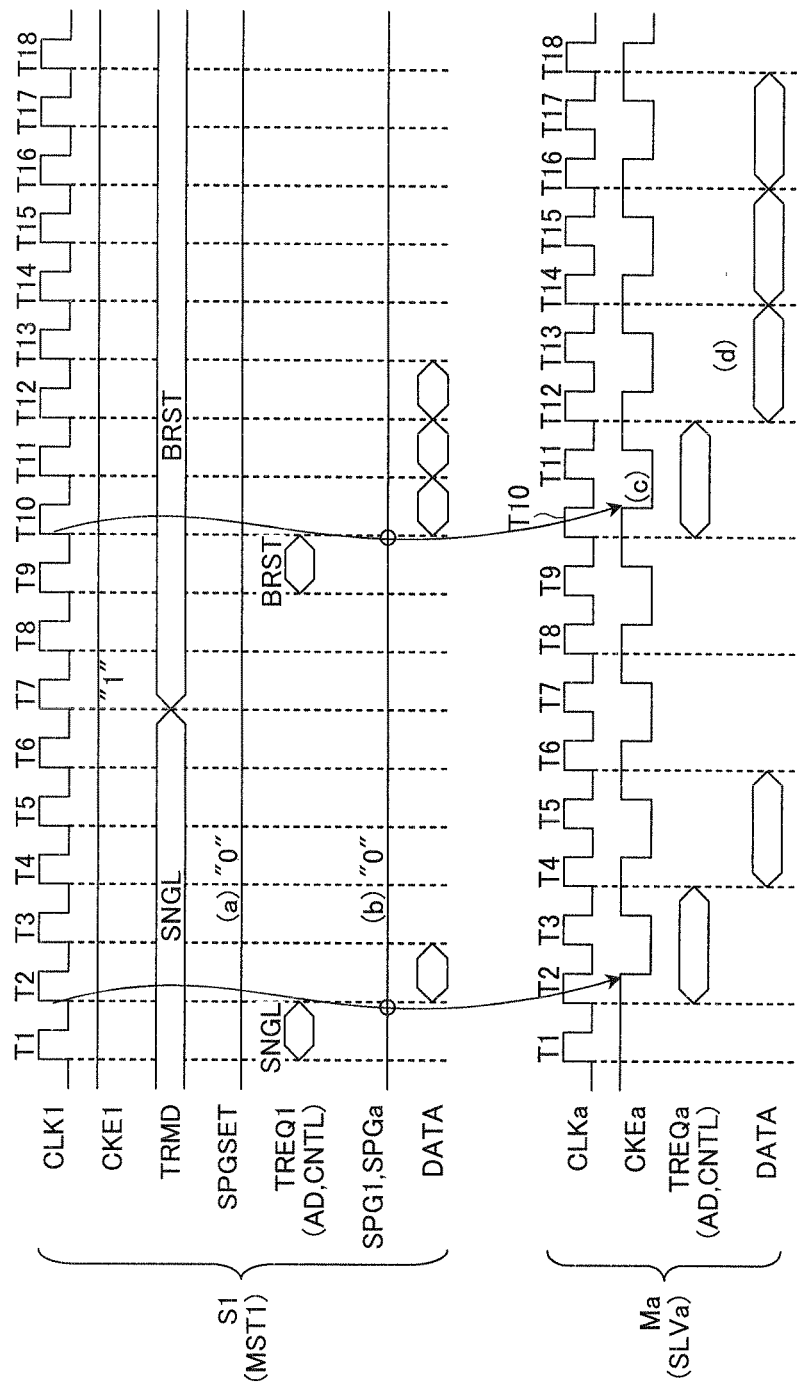
FIG. 6 illustrates an example of an operation of a data processing system having the master illustrated in FIG. 5.

FIG. 6 illustrates an example of an operation of the data processing system DPS having the masters MST1-MST4 illustrated in FIG. 5. Detailed description of an operation identical to that of FIG. 4 is omitted. FIG. 6 illustrates, similarly to FIG. 4, a waveform of a signal output from the master MST1 to the slave port S1 and a waveform of a signal output from the master port Ma to the slave SLVa.

In this example, the data processing system DPS has entered the low power mode and the speed grade set register SPGSET of the master MST1 illustrated in FIG. 5 has been set to logic "0" (FIG. 6 (a)). Therefore, the speed grade signal SPG1 is fixed to logic "0" regardless of the value of the transfer mode register TRMD (FIG. 6 (b)). The operation of the master MST1 and the operation of the slave SLVa up to the clock cycle T9 are identical to those of FIG. 4.

After the clock cycle T10 of the clock signal CLKa, the clock enable generation circuit CKEGENa receives the speed grade signal SPG1 of logic "0" and changes the logic level of the clock enable signal CKEa for each falling edge of the clock signal CLKa (FIG. 6 (c)). The master port Ma then outputs the transfer request TREQa and the three pieces of write data DATA to the slave SLVa with a period twice that of FIG. 4 (FIG. 6 (d)). In other words, the operation frequency of the slave SLVa is lowered and the burst write operation is performed in a low power consumption state.

Figure 7:
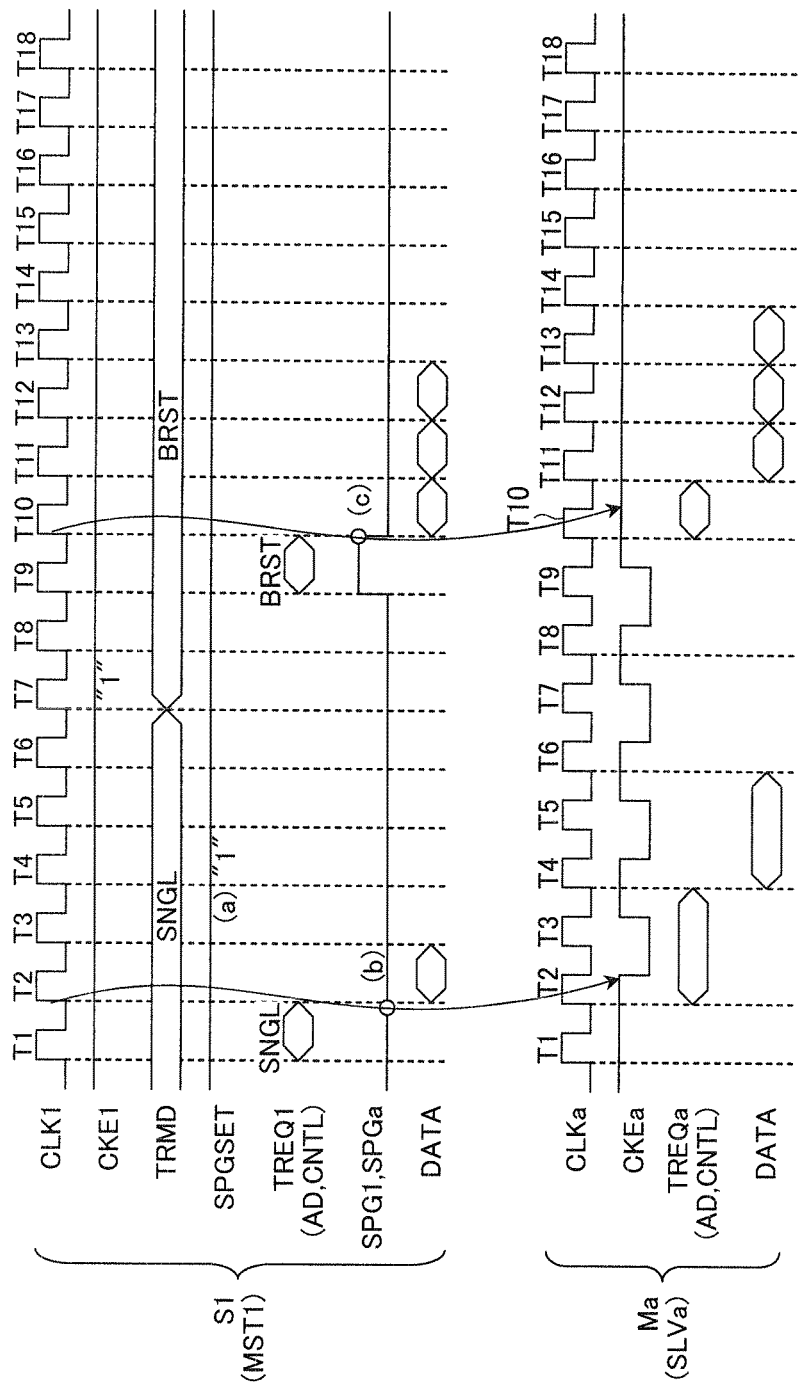
FIG. 7 illustrates another example of an operation of the data processing system having the master illustrated in FIG. 5.

FIG. 7 illustrates another example of an operation of the data processing system DPS having the masters MST1-MST4 illustrated in FIG. 5. Detailed description of an operation identical to that of FIG. 4 is omitted. FIG. 7 illustrates, similarly to FIG. 4, a waveform of a signal output from the master MST1 to the slave port S1 and a waveform of a signal output from the master port Ma to the slave SLVa.

In this example, the speed grade set register SPGSET of the master MST1 illustrated in FIG. 5 has been set to logic "1" (FIG. 7 (a)). Therefore, the speed grade signal SPG1 is output from the master MST1, with the transfer request TREQ1, according to the value of the transfer mode register TRMD (FIG. 7 (b, c)). Accordingly, the operation of the slave SLVa becomes identical to that of FIG. 4.

In FIGS. 6 and 7, the operation when logic "0" indicating the register transfer mode or logic "1" indicating the data transfer mode is stored in the transfer mode register TRMD is indicated by replacing the single transfer mode SNGL with the register transfer mode and replacing the burst transfer mode BRST with the data transfer mode. In this occasion, a burst transfer with a burst length of "3" is performed as a transfer according to the data transfer mode.

As thus described, this embodiment also brings about a similar effect to that of the above-mentioned embodiments. Furthermore, the operation frequency of the slave SLVa may be set regardless of the set value of the transfer mode register TRMD by providing each of the transfer set registers TRREG1-4 with the speed grade set register SPGSET which sets the transfer mode register TRMD to a valid or invalid state. For example, when the data processing system DPS has entered the low power mode, a simple control may lower the power consumption of the slave SLVa by setting the speed grade set register SPGSET to logic "0".

Figure 8:
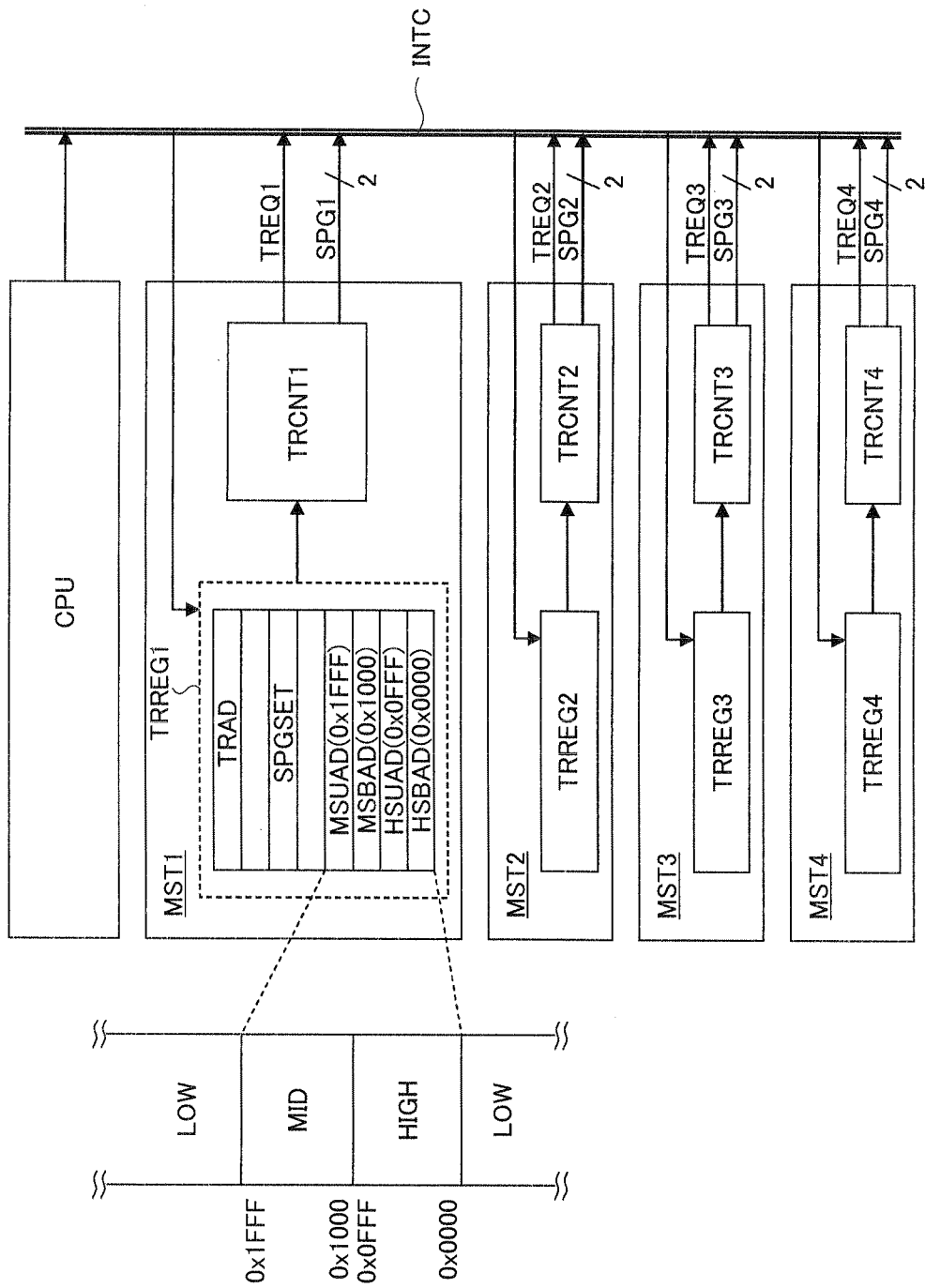
FIG. 8 illustrates an example of masters in another embodiment.

FIG. 8 illustrates an example of masters MST1-MST4 in another embodiment. The components identical to those described in the above-mentioned embodiment are provided with identical symbols and detailed description thereof is omitted. The configuration excluding the masters MST1-4 is similar to that of the data processing system DPS illustrated in FIG. 2.

As for the masters MST1-4, the transfer set registers TRREG1-4 and the transfer control circuits TRCNT1-4 are different from those of FIG. 3. Each of the transfer set registers TRREG1-4 has a transfer address register TRAD, a speed grade set register SPGSET and address area registers MSUAD, MSBAD, HSUAD, and HSBAD added to each of the transfer set registers TRREG1-4 illustrated in FIG. 3.

The address area registers MSUAD, MSBAD, HSUAD, and HSBAD may be formed for each of the slaves SLVa-d illustrated in FIG. 1, although not particularly limited thereto. The function of the speed grade set register SPGSET is similar to that of FIG. 5. Since the transfer set registers TRREG1-4 are identical to each other, the transfer set register TRREG1 will be described below.

The transfer address register TRAD stores the transfer address of a memory or a register in the slave SLV (one of the slaves SLVa-d) that transfers data in response to the transfer request TREQ1. The address area registers MSUAD and MSBAD respectively indicate the upper and lower limits of an address area MID in which the corresponding slaves SLVa-d is caused to operate at a middle speed in response to the transfer request TREQ1. The address area registers HSUAD and HSBAD respectively indicate the upper and lower limits of the address area HIGH in which the corresponding slaves SLVa-d is caused to operate at a high speed in response to the transfer request TREQ1.

There may be a case where the slave SLVa is always caused to operate at a middle speed and the slave SLVb is always caused to operate at a high speed, for example. In this occasion, the upper and lower limits of the address indicating the slave SLVa may be set in the address area registers MSUAD and MSBAD, and the upper and lower limits of the address indicating the slave SLVb may be set in the address area registers HSUAD and HSBAD.

In FIG. 8, "0x1FFF", "0x1000", "0x0FFF", and "0x0000" indicates hexadecimal numbers, where "x" within the hexadecimal numbers indicates an arbitrary value from "0" to "F". The area excluding the address areas MID and HIGH is an address area LOW which causes the slaves SLVa-d to operate at a low speed. The address areas MID, HIGH, and LOW include addresses of a memory and a register formed in each of the slaves SLVa-d.

The transfer control circuits TRCNT1-4 respectively output the 2-bit speed grade signals SPG1-4 with the transfer requests TREQ1-4. Since the transfer control circuits TRCNT1-4 are identical to each other, the transfer control circuit TRCNT1 will be described below. Similarly to FIG. 5, the transfer control circuit TRCNT1 has a function of fixing the speed grade signal SPG1 to binary "00" when the speed grade set register SPGSET is at logic "0". The binary "00" of the speed grade signal SPG1 indicates a data transfer at a low speed. In the following description, logic of the speed grade signal SPG1 is indicated by a binary number.

If the speed grade set register SPGSET has been set to logic "1", the transfer control circuit TRCNT1 sets the logic of the speed grade signal SPG1, according to the value of transfer address register TRAD. For example, when the transfer address stored in the transfer address register TRAD is included in the address area MID, the speed grade signal SPG1 is set to "01", which indicates data transfer at a middle speed. When the transfer address stored in the transfer address register TRAD is included in the address area HIGH, the speed grade signal SPG1 is set to "10", which indicates data transfer at a high speed. When the transfer address stored in the transfer address register TRAD is not included in either of the address areas MID and HIGH, the speed grade signal SPG1 is set to "00", which indicates data transfer at a low speed.

Figure 9:
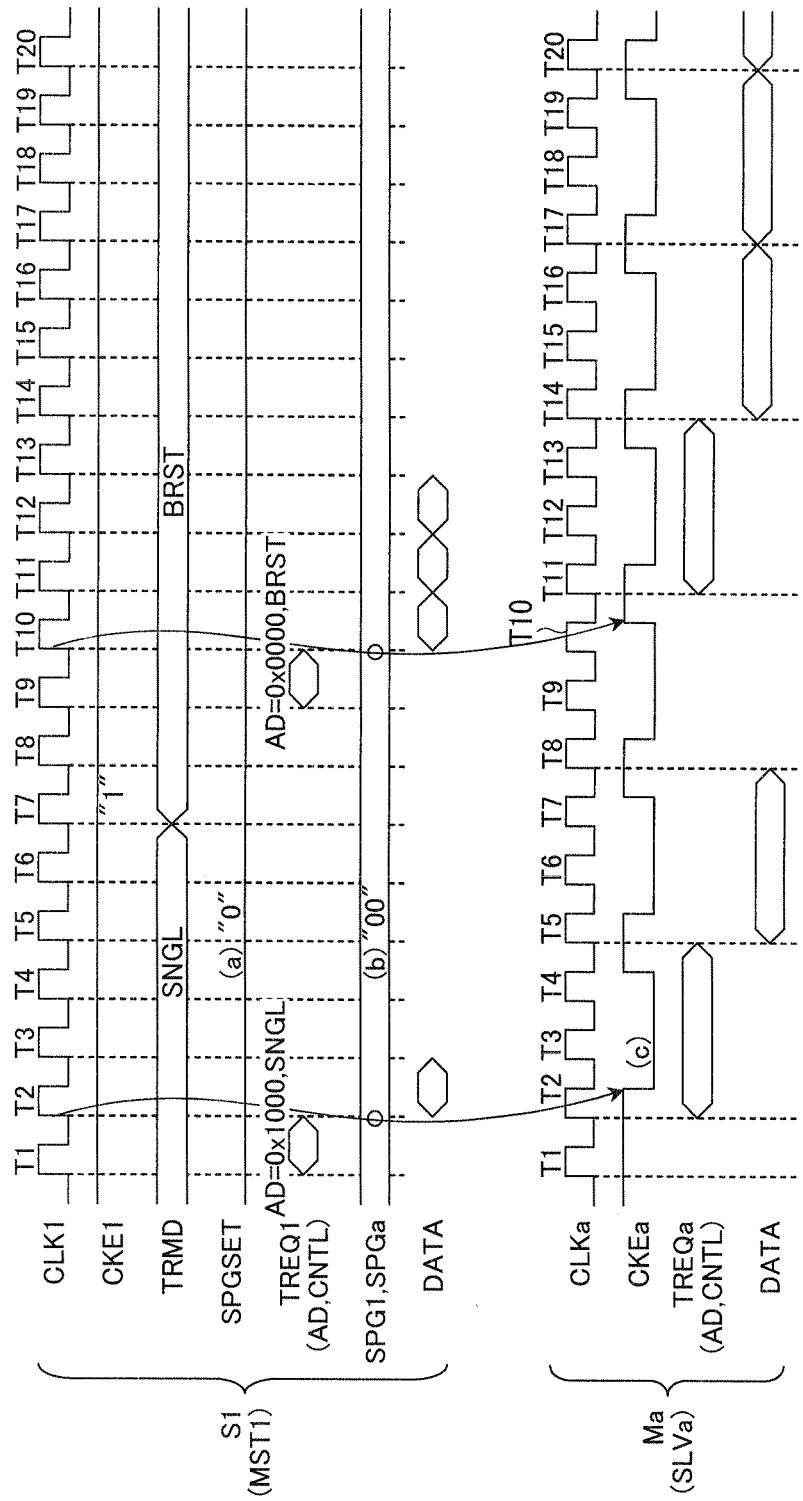
FIG. 9 illustrates an example of an operation of a data processing system having the master illustrated in FIG. 8.

FIG. 9 illustrates an example of an operation of the data processing system DPS having the masters MST1-MST4 illustrated in FIG. 8. Detailed description of an operation identical to that of FIG. 4 is omitted. FIG. 9 illustrates, similarly to FIG. 4, a waveform of a signal output from the master MST1 to the slave port S1 and a waveform of a signal output from the master port Ma to the slave SLVa.

In this example, the data processing system DPS has entered the low power mode and the speed grade set register SPGSET has been set to logic "0". The speed grade set register SPGSET of the master MST1 illustrated in FIG. 8 has been set to logic "0" (FIG. 9 (*a*)). Therefore, the speed grade signal SPG1 is fixed to binary "00" regardless of the value of the transfer mode register TRMD (FIG. 9 (*b*)). The operation of the master MST1 is identical to that of FIG. 4 except that the transfer address AD included in the transfer request TREQ1 is illustrated.

The clock enable generation circuit CKEGENa illustrated in FIG. 2 receives "00" of the speed grade signal SPGa and sets the clock enable signal CKEa to logic "1", once in three clock cycles of the clock signal CLKa (FIG. 9 (*c*)). Accordingly, the operation frequency of the slave SLVa becomes one third of the frequency of the clock signal CLKa and the data transfer rate also becomes one third. In other words, when the speed grade signal SPG1 of logic "00" is output with the transfer request TREQ1, the slave SLVa operates in a low speed mode in the single transfer mode SNGL and the burst transfer mode BRST. Accordingly, power consumption of the slave SLVa may be reduced, similarly to FIG. 6.

Figure 10:
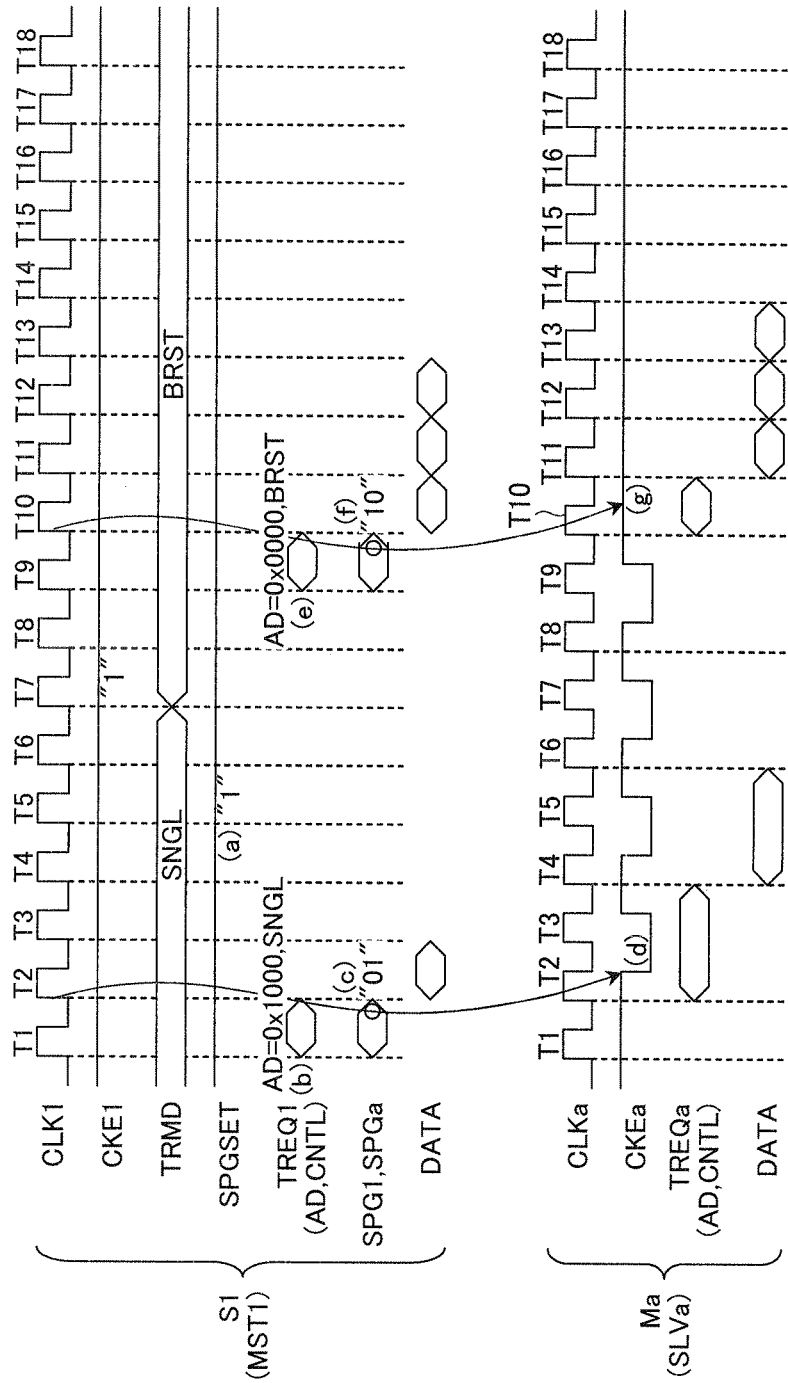
FIG. 10 illustrates another example of an operation of the data processing system having the master illustrated in FIG. 8.

FIG. 10 illustrates another example of an operation of the data processing system DPS having the masters MST1-MST4 illustrated in FIG. 8. Detailed description of an operation identical to that of FIG. 4 is omitted. FIG. 10 illustrates, similarly to FIG. 4, a waveform of a signal output from the master MST1 to the slave port S1 and a waveform of a signal output from the master port Ma to the slave SLVa.

In this example, the speed grade set register SPGSET of the master MST1 illustrated in FIG. 8 has been set to logic "1" (FIG. 10 (*a*)). Therefore, the speed grade signal SPG1 is output from the master MST1 with the transfer request TREQ1, according to the transfer address AD stored in the transfer address register TRAD. For example, the transfer address AD (="0x1000") included in the first transfer request TREQ1 indicates the address area MID illustrated in FIG. 8 (FIG. 10 (*b*)).

Therefore, the transfer control circuit TRCNT1 outputs the speed grade signal SPG1 of logic "01" with the transfer request TREQ (FIG. 10 (*c*)). The clock enable generation circuit CKEGENa illustrated in FIG. 2 receives the speed grade signal SPG1 of logic "01" and sets the clock enable signal CKEa to logic "1", once in two clock cycles (FIG. 10 (*d*)).

Accordingly, the operation frequency of the slave SLVa becomes one half of the frequency of the clock signal CLKa and the data transfer rate also becomes one half. In other words, when the speed grade signal SPG1 of logic "01" is output with the transfer request TREQ1, the slave SLVa operates in a middle speed mode in the single transfer mode SNGL.

The transfer address AD (="0x0000") included in the next transfer request TREQ1 indicates the address area HIGH illustrated in FIG. 8 (FIG. 10 (*e*)). Therefore, the transfer control circuit TRCNT1 outputs the speed grade signal SPG1 of logic "10" with the transfer request TREQ (FIG. 10 (*f*)). The clock enable generation circuit CKEGENa illustrated in FIG. 2 receives the speed grade signal SPG1 of logic "10" and fixes the clock enable signal CKEa to logic "1" (FIG. 10 (*g*)). Accordingly, a burst transfer of data is performed at the highest transfer rate, similarly to the clock cycles T10-T13 illustrated in FIG. 4. In other words, when the speed grade signal SPG1 of logic "10" is output with the transfer request TREQ1, the slave SLVa operates in a high speed mode in the burst transfer mode BRST.

The operation described in FIG. 8 when causing the slave SLVa to always operate at a middle speed and causing the slave SLVb to always operate at a high speed is realized by outputting, to the slave SLVb, the transfer request TREQ1 according to the burst transfer mode BRST of FIG. 10.

As thus described, this embodiment also brings about a similar effect to that of the above-mentioned embodiments. Furthermore, the operation frequency of the slave SLVa may be changed according to the address AD accessed. Therefore, a fine control of the dynamic power of the data processing system DPS may be easily performed according to the type of data transferred or application, and power consumption may be reduced without degrading the performance of the data processing system DPS.

Figure 11:
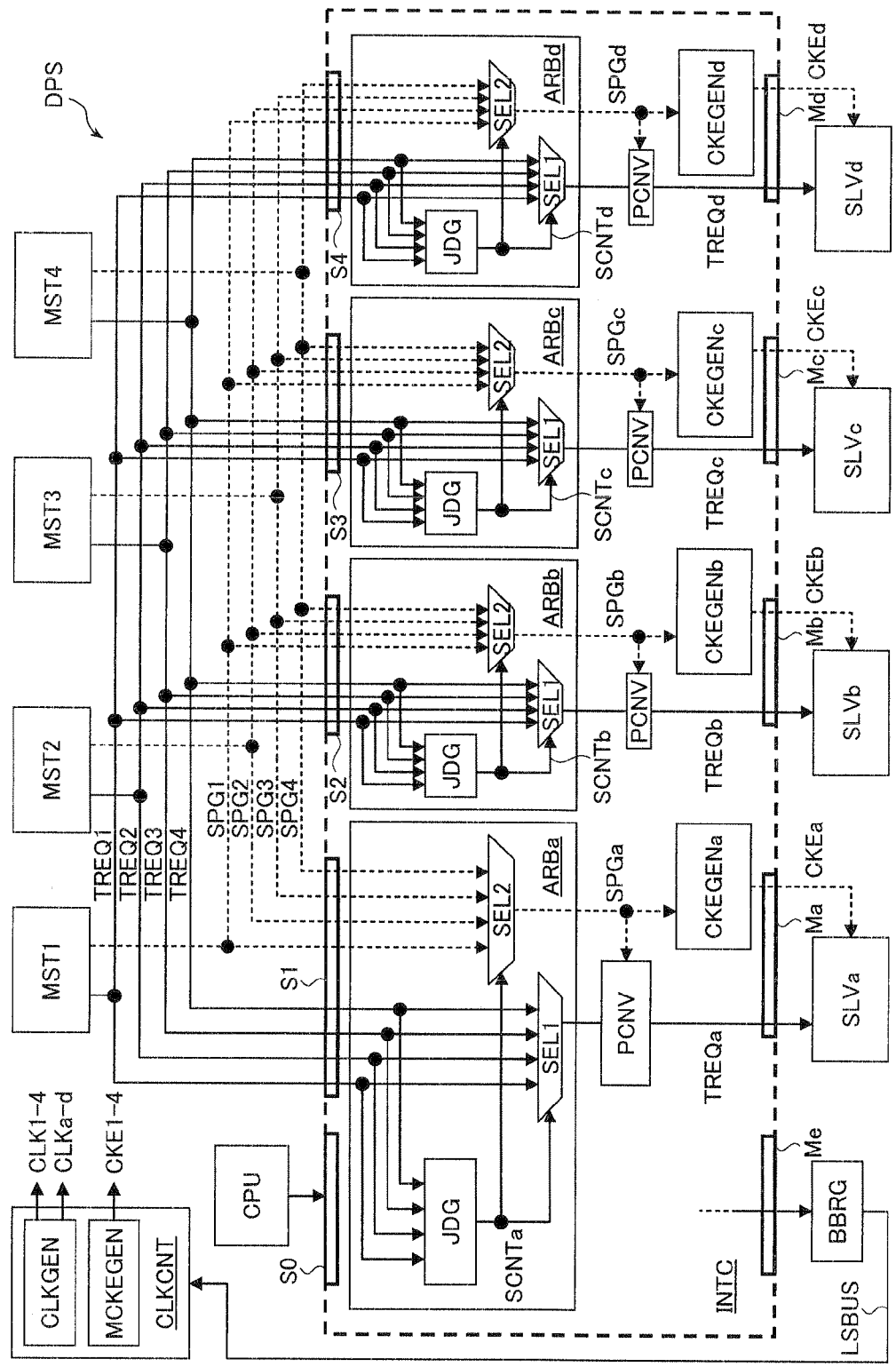
FIG. 11 illustrates an example of a data processing system in another embodiment.

FIG. 11 illustrates an example of a data processing system DPS in another embodiment. The components identical to those described in the above-mentioned embodiment are provided with identical symbols and detailed description thereof is omitted. In this embodiment, the interconnect INTC has protocol conversion circuits PCNV provided between the arbiters ARBa-d and the master ports Mb-Md, respectively. The masters MST1-4 are similar to those of FIG. 5. The masters MST1-4 may be similar to those of FIG. 8. The configuration excluding the protocol conversion circuits PCNV and the masters MST1-4 is similar to that of FIG. 2.

When the corresponding speed grade signal SPG (one of SPGa-d) is at logic "0", the protocol conversion circuit PCNV converts the transfer request TREQ (one of TREQ1-4) according to the burst transfer mode BRST into a plurality of transfer requests TREQ according to the single transfer mode SNGL.

Figure 12:
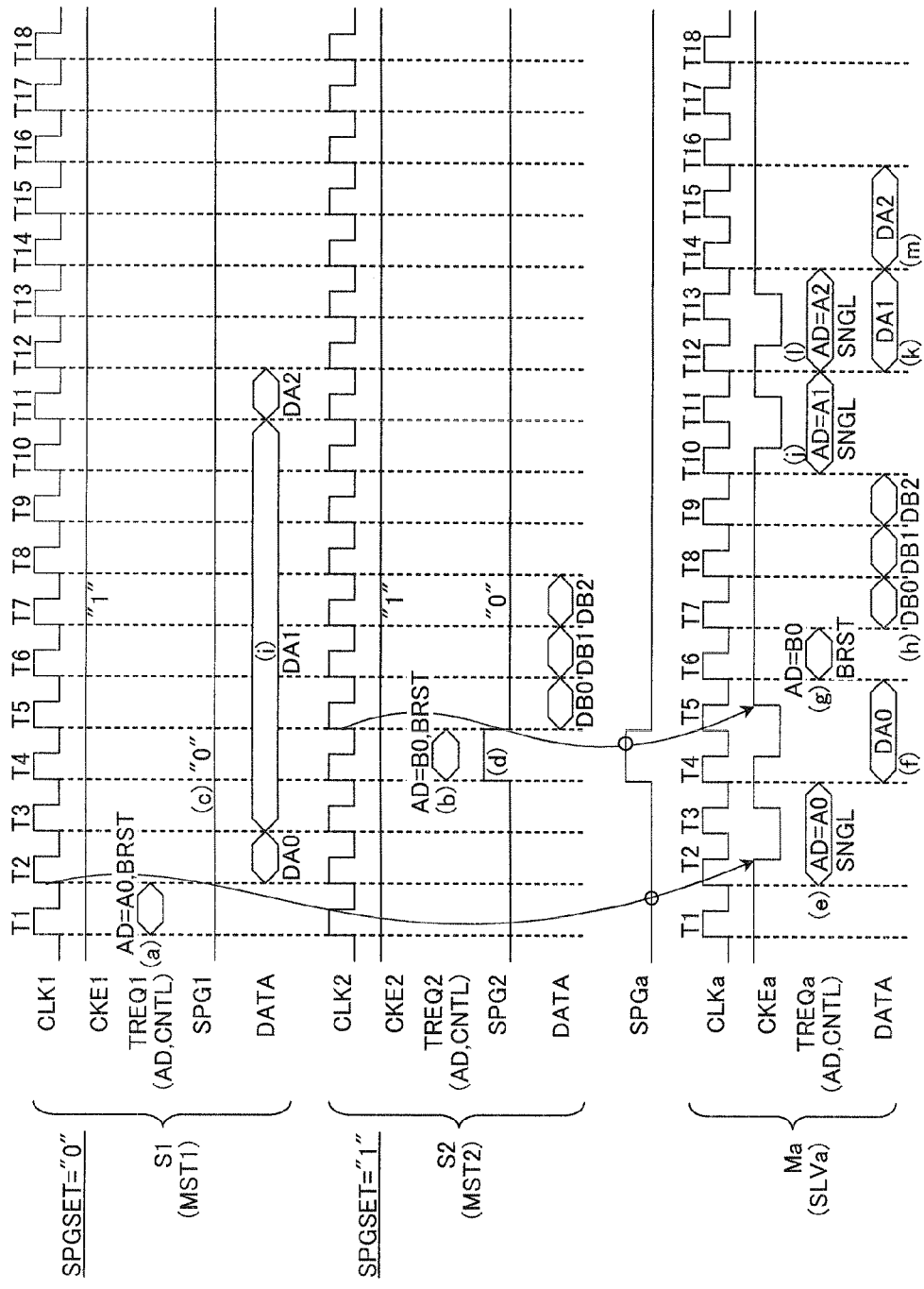
FIG. 12 illustrates an example of an operation of the data processing system illustrated in FIG. 11.

FIG. 12 illustrates an example of an operation of the data processing system DPS illustrated in FIG. 11. Detailed description of an operation identical to that of FIG. 4 is omitted. In FIG. 12, the transfer request TREQ2 is output from the master MST2 to the slave SLVa after the transfer request TREQ1 has been output from the master MST1 to the slave. SLVa (FIG. 12 (*a, b*)). The transfer mode registers TRMD of the masters MST1-2 are both set to logic "1" indicating burst transfer mode BRST. The speed grade set register SPGSET of the master MST1 is set to logic "0", and the speed grade signal SPG1 is fixed to logic "0" (FIG. 12 (*c*)). In other words, the data transfer speed corresponding to the transfer request TREQ1 from the master MST1 is set to be lowest. The speed grade set register SPGSET of the master MST2 is set to logic "1", and the speed grade signal SPG2 is set to logic "1" with the transfer request TREQ2 (FIG. 12 (*d*)). In other words, the data transfer speed corresponding to the transfer request TREQ2 from the master MST2 is set higher than the data transfer speed corresponding to the transfer request TREQ1 from the master MST1.

The protocol conversion circuit PCNV corresponding to the arbiter ARBa illustrated in FIG. 11 divides the transfer request TREQ1 according to the burst transfer mode BRST into a plurality of transfer requests TREQa according to the single transfer mode SNGL when the speed grade signal SPGa is at logic "0". The protocol conversion circuit PCNV then outputs one of the plurality of transfer requests TREQa according to the single transfer mode SNGL to the master port Ma (FIG. 12 (*e*)). The slave SLVa receives the first transfer request TREQ1 (BRST) by the master MST1 as the transfer request TREQa (SNGL) and writes data DA0 into the address A0 (FIG. 12 (*f*)).

While the data DA0 is being written, the arbiter ARBa receives the transfer request TREQ2 (BRST) from the master MST2 and transmits it to the protocol conversion circuit PCNV. The protocol conversion circuit PCNV determines to prioritize the transfer request TREQ2 from the master MST2 because the speed grade signal SPG2 from the master MST2 indicates logic "1". The protocol conversion circuit PCNV then temporarily interrupts the transfer operation associated with the transfer request TREQ1 from the master MST1, and outputs the transfer request TREQ2 (BRST) from the master MST2 to the master port Ma as the transfer request TREQa (BRST) (FIG. 12 (*g*)). The slave SLVa operates in response to the transfer request TREQa (BRST) from the master MST2 and writes data DB0, DB1, and DB2 sequentially into three successive addresses including the head address B0 (FIG. 12 (*h*)). In other words, the burst write operation is performed.

While the burst transfer by the master MST2 is being performed, the master MST1 receives a wait signal via the slave port S1. Accordingly, the master MST1 continues to output the second write data DA1 (FIG. 12 (*i*)). After the burst transfer by the master MST2 has been completed, the protocol conversion circuit PCNV restarts the transfer operation by the master MST1 which has been interrupted. For example, the protocol conversion circuit PCNV corresponding to the arbiter ARBa sequentially outputs, via the master port Ma to the slave SLVa, the transfer request TREQa (AD=A1) according to the single transfer mode SNGL and the write data DA1 (FIG. 12 (*j*)). Accordingly, the second data DA1 from the master MST1 is written into the slave SLVa (FIG. 12 (*k*)).

During the clock cycles T12-T13 in which the data DA1 is being written, the other masters MST2-4 do not output a burst transfer request associated with the speed grade signals SPG2-4 of logic "1". Therefore, the protocol conversion circuit PCNV corresponding to the arbiter ARBa sequentially outputs, via the master port Ma to the slave SLVa, the transfer request TREQa (AD=A2) according to the single transfer mode SNGL and the write data DA2 (FIG. 12 (*l*)). Accordingly, the third data DA2 from the master MST1 is written into the slave SLVa (FIG. 12 (*m*)).

As thus described, this embodiment also brings about a similar effect to that of the above-mentioned embodiments. Furthermore, data transfer according to the burst transfer mode BRST of a high transfer speed may be performed with a higher priority by dividing the data transfer according to the burst transfer mode BRST of a low transfer speed into data transfers according to the single transfer mode SNGL. As a result, power consumption may be reduced without degrading the performance of the data processing system DPS.

In the above-mentioned embodiments, examples of outputting the transfer request TREQ1 from the master MST to the slave SLVa in order to write data have been described. However, for example, the transfer request TREQ1 may be output from the slave SLVa to the master MST1 in order to read data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing system comprising:
   a plurality of master devices configured to output data transfer requests and speed grade signals indicating data transfer speeds;
   a plurality of arbiters each configured to arbitrate the transfer requests and the speed grade signals from the plurality of master devices;
   a plurality of clock enable generation circuits each configured to generate a clock enable signal, a ratio of a period of a valid level of the clock enable signal varying in accordance with one of the speed grade signals arbitrated by the arbiters; and
   a plurality of slave devices each provided for a corresponding one of the arbiters and a corresponding one of the clock enable generation circuits, and each configured to operate upon receiving a clock signal when a corresponding clock enable signal is at the valid level and to transfer data according to one of the transfer requests arbitrated by the corresponding one of the arbiters,
   wherein each of the plurality of master devices generates the speed grade signals according to a transfer mode of data with each process of generating the transfer requests.

2. The data processing system according to claim 1, wherein
   each of the master devices includes a transfer mode register in which the transfer mode is set, and
   each of the speed grade signals is generated according to the transfer mode set in the transfer mode register.

3. The data processing system according to claim 2, wherein the transfer mode is one of a single transfer mode which transfers a single piece of data for each of the transfer requests and a burst transfer mode which transfers a plurality of pieces of data for each of the transfer requests.

4. The data processing system according to claim 3, further comprising a protocol conversion circuit provided between each of the arbiters and each of the slave devices, configured to convert one of the transfer requests according to the burst transfer mode into a plurality of the transfer requests according to the single transfer mode when one of the speed grade signals indicating a first transfer speed of a lowest transfer speed is output from one of the master devices with the one of the transfer requests according to the burst transfer mode, configured to temporarily interrupt data transfer according to a converted single transfer mode when another one of the speed grade signals indicating a transfer speed which is higher than the first transfer speed is output from another one of the master devices with another one of the transfer requests while data is transferred according to the converted single transfer mode, configured to transfer data according to the another one of the transfer requests from the another one of the master devices, and configured to transfer data without interruption according to the converted single transfer mode when the another one of the speed grade signals is not output from the another one of the master devices while data is transferred according to the converted single transfer mode.

5. The data processing system according to claim 2, wherein the transfer mode is one of a register transfer mode which transfers data to a register formed in the slave devices, and a memory transfer mode which transfers data to a memory cell formed in the slave devices.

6. The data processing system according to claim 2, wherein each of the master devices includes a speed grade set register which sets the transfer mode register to a valid state while a low power mode is not set and sets the transfer mode register to an invalid state while the low power mode is set, and outputs one of the speed grade signals indicating a preliminarily set transfer speed regardless of a value set in the transfer mode register when the transfer mode register is set to an invalid state by the speed grade set register.

7. The data processing system according to claim 1, wherein each of the master devices includes a plurality of address area registers in which address areas corresponding to a plurality of the transfer speeds are respectively set in the slave devices, and outputs one of the speed grade signals indicating a corresponding transfer speed when a transfer address of data is included in the address area which is set in one of the address area registers.

8. The data processing system according to claim 1, wherein each of the master devices includes:
 a transfer mode register configured to be reset when the transfer mode indicates a first transfer speed of a lowest transfer speed and to be set when the transfer mode indicates a second transfer speed which is higher than the first transfer speed;
 a speed grade set register configured to be reset during a low power mode and to be set when not in the low power mode; and
 a transfer control circuit configured to receive an output of the transfer mode register and an output of the speed grade set register, to output one of the speed grade signals indicating one of the first transfer speed and the second transfer speed according to a value set in the transfer mode register when the output of the speed grade set register indicates a set state, and to output one of the speed grade signals indicating the first transfer speed by masking the value set in the transfer mode register when the output of the speed grade set register indicates a reset state.

* * * * *